(12) United States Patent
Watanabe et al.

(10) Patent No.: US 6,762,860 B1
(45) Date of Patent: Jul. 13, 2004

(54) NETWORK PHOTOGRAPH SERVICE SYSTEM

(75) Inventors: Michito Watanabe, Kanagawa-ken (JP); Makoto Hara, Kanagawa-ken (JP); Takashi Yatabe, Kanagawa-ken (JP)

(73) Assignee: Fuji Photo Film Co., Ltd., Kanagawa-ken (JP)

( * ) Notice: Subject to any disclaimer, the term of this patent is extended or adjusted under 35 U.S.C. 154(b) by 0 days.

(21) Appl. No.: 09/247,281

(22) Filed: Feb. 9, 1999

(30) Foreign Application Priority Data

Feb. 9, 1998 (JP) ............................................. 10-027181

(51) Int. Cl.$^7$ ............................. G06F 17/30; H04N 1/00; G06K 9/60
(52) U.S. Cl. ..................... 358/403; 707/104.1; 382/305
(58) Field of Search ............................... 358/440, 1.15, 358/487, 403, 506, 407, 409, 460; 707/502, 205, 104, 200; 345/112; 382/128, 134, 305; 709/201, 232, 246; 348/231.2

(56) References Cited

U.S. PATENT DOCUMENTS

| | | | | |
|---|---|---|---|---|
| 4,691,340 A | * | 9/1987 | Maeda et al. | |
| 5,124,789 A | * | 6/1992 | Hiyama et al. | |
| 5,163,147 A | * | 11/1992 | Orita | |
| 5,528,492 A | * | 6/1996 | Fukushima | ..................... 707/1 |
| 5,533,186 A | * | 7/1996 | Tanahashi et al. | |
| 5,553,277 A | * | 9/1996 | Hirano et al. | |
| 5,760,917 A | * | 6/1998 | Sheridan | |
| 5,831,714 A | * | 11/1998 | Yoshikawa | .................... 355/40 |
| 5,926,288 A | * | 7/1999 | Dellert et al. | |
| 5,999,766 A | * | 12/1999 | Hisatomi et al. | |
| 6,017,157 A | * | 1/2000 | Garfinkle et al. | ........... 396/639 |
| 6,035,323 A | * | 3/2000 | Narayen et al. | |
| 6,108,104 A | * | 8/2000 | Tesavis | |
| 6,108,790 A | * | 8/2000 | Moriya et al. | |
| 6,119,132 A | * | 9/2000 | Kuwano | |
| 6,137,897 A | * | 10/2000 | Emi et al. | |
| 6,154,295 A | * | 11/2000 | Fredlund et al. | |
| 6,178,422 B1 | * | 1/2001 | Tada et al. | |
| 6,181,837 B1 | * | 1/2001 | Cahill et al. | ................. 382/305 |
| 6,208,426 B1 | * | 3/2001 | Saito et al. | |
| 6,222,646 B1 | * | 4/2001 | Maurinus et al. | |
| 6,237,010 B1 | * | 5/2001 | Hui et al. | |
| 6,240,518 B1 | * | 5/2001 | Ookie et al. | |
| 6,275,825 B1 | * | 8/2001 | Kobayashi et al. | |
| 6,292,577 B1 | * | 9/2001 | Takahashi | |
| 6,578,072 B2 | * | 6/2003 | Watanabe et al. | ........... 709/217 |

FOREIGN PATENT DOCUMENTS

| | | | |
|---|---|---|---|
| EP | 0558054 | * | 2/1993 |
| EP | 0756414 | * | 1/1997 |
| EP | 756414 A | | 1/1997 |
| EP | 767575 A | | 4/1997 |
| EP | 0767575 | * | 4/1997 |
| WO | 9707468 A | | 2/1997 |
| WO | 97/07468 | * | 2/1997 |

* cited by examiner

*Primary Examiner*—Bhavesh M. Mehta
*Assistant Examiner*—Christopher Sukhaphadhana
(74) *Attorney, Agent, or Firm*—Birch, Stewart, Kolasch & Birch, LLP (57) ABSTRACT

In a network photograph service which provides a digital photograph service on a network, a workload on a user to input a registration ID needed upon viewing an image is reduced. In a registration ID input screen 38, the registration ID and a registration password input to boxes 39 and 40 are stored by relating the two to the user ID of the user who has carried out the input. When the same user recalls the registration ID input screen 38, registration IDs 32 having been stored are displayed as a list. By selecting one of the registration IDs by clicking a display button 41, display of images managed under the registration ID can be requested.

8 Claims, 6 Drawing Sheets

NETWORK PHOTOGRAPH SERVICE SYSTEM

BACKGROUND OF THE INVENTION

1. Field of the Invention

The present invention relates to a network photograph service system and method which provide a digital photograph service, such as a printing service, on a network.

2. Description of the Related Art

As of a digital photograph service, a network photograph service has been known wherein a digital image belonging to a user is stored (registered) in a system of a service provider and a printing order or the like is received via a network such as the Internet.

In such a service, if a user requests registration of a digital image from a laboratory upon film development, for example, a registration ID is issued to the user. One registration ID is generally issued to images on one set/roll of film.

The photographs recorded on the film are digitized at the laboratory or at a dedicated service center, stored in a system of the service provider, and disclosed on the network. The user can browse the images registered under the registration ID by inputting the registration ID to the system of the service provider which he/she accessed via the network.

In such a conventional service, a user has to input the registration ID whenever he/she accesses the system. Therefore, if the number of registrations per user increases following the spread of the network photographic service, a user has to manage a plurality of registration IDs and input a registration ID corresponding to an image to be browsed each time. If more registration IDs are issued in the future, it becomes possible for the registration IDs to have more digits or more kinds of characters used therein. In other words, the more frequently the service is used, the heavier the load becomes on a user to manage or input registration IDs.

As a method to reduce the load of management or input of the registration IDs, it is possible that only one registration ID is issued to one user and all images registered by the user are managed by the registration ID. However, in the case where the number of registered images per user is large, it is more convenient for the user to manage and browse the images according to a classification by the date of registration or the like. Therefore, management of all images of a user by only one registration ID is not preferable.

Realization of a network photograph service which enables management of images according to a classification and reduces the load on management or input of registration IDs has thus been desired. An object of the present invention is therefore to provide a system for realizing such a network photograph service.

SUMMARY OF THE INVENTION

By disclosing images registered by a service user on a network, a network photograph service system of the present invention provides to the service user a variety of services using the images. The network photograph service system comprises:

registered image storing means for storing the images by relating the images to a predetermined registration ID;
user ID input means for causing the service user to input a user ID for identifying the service user;
registration ID input means for enabling the service user to input the registration ID;
first image display means for displaying the images which are stored in the registered image storing means and related to the input registration ID, when the registration ID is input by the registration ID input means;
registration list storing means for storing the registration ID by relating the registration ID with the user ID input by the user ID input means, when the registration ID is input by the registration ID input means;
registration ID display means for displaying a list of all registration IDs which are stored in the registration list storing means and related to the user ID input by the user ID input means;
registration ID selecting means for enabling the service user to select a desired one of the listed registration IDs; and
second image display means for displaying the images which are stored in the registered image storing means and related to the selected registration ID when the registration ID is selected by the registration ID selecting means.

Further, the present invention provides a method of network photograph service which provides to a service user a variety of services using images registered by the service user by disclosing the images on a network, the network photograph service method comprising:

storing the registered images by relating the images to a predetermined registration ID;
causing the service user to input a user ID for identifying the service user;
enabling the service user to input the registration ID;
displaying the images which are stored by the registered image storing step and related to the input registration ID, when the registration ID is input by the registration ID input means;
storing the registration ID by relating the registration ID to the user ID input by the user ID input step, when the registration ID is input by the registration ID input step;
displaying a list of all registration IDs which are stored by the registration list storing step and related to the user ID input by the user ID input step;
enabling the service user to select a desired one of the listed registration IDs; and
displaying the images which are stored by the registered image storing step and related to the selected registration ID, when the registration ID is selected by the registration ID selecting step.

The "predetermined registration ID" herein referred to means an identifier to identify an image group including at least one image. For example, the predetermined registration ID is assigned to a group of images classified according to some rule, such as one registration ID for images registered on one day, or one registration ID for images recorded on one film.

Meanwhile the "user ID" is an identifier assigned uniquely to each user. The user ID is issued to a user when he/she has registered himself/herself with the service provider, and the user ID is stored in the system. The "user ID input means" prompts a user who has accessed the system to input the user ID and obtains the input user ID. A user has to input a user ID in order to use the network photograph service. The system refuses an unauthorized access by comparing the input user ID with the user ID stored in the system. More preferably, authentication is carried out using a password as well as the user ID.

The "registration ID input means" prompts the user to input the registration ID and obtains the registration ID input into the system. However, in the present invention, the registration ID input means is the means for "enabling an input of a registration ID", and input of the registration ID is not necessarily required.

As in a conventional system, the "first image display means" reads and displays the images by searching an image database storing registered images, in response to the input registration ID.

The "registration list storing means" retains information indicating a relationship between the user ID and the registration ID in the form of a relation table, for example. Whenever a new registration ID is input, the relation table or the like is updated by the registration list storing means.

The "registration ID display means" displays a list of the information retained in the form of the relation table or the like when the authentication of the user has been finished. The "registration ID selecting means" enables the user to select a desired registration ID among the listed registration IDs by using a mouse or the like, and obtains the information having been input.

The "second image display means" reads and displays the images from the image database or the like, in response to the selected registration ID.

The above network photograph service system may further comprise comment setting means which enables the service user to set a comment on each registration ID; and
  the registration ID display means may display a list of comments on the registration IDs having been set by the comment setting means, together with the registration IDs.

It is preferable for the registration list storing means to store each registration ID in relation to only one user ID. More specifically, when a registration ID is input, whether or not the registration ID has been related to another user ID is checked by searching the relation table or the like stored by the registration list storing means. When a relation to another user ID has been found, an error message or the like is output, for example.

In a conventional system, the registration ID having been input is used only for searching the images to be displayed and discarded after completion of image search or display. Therefore, the user has to input the registration ID again when he/she wishes to view the same image.

On the other hand, in the system of the present invention, a registration ID having been input once is retained by the system after being related to the user ID of the user who has input the registration ID. When the user accesses the system later, the registration ID having been input is displayed as a choice of registration IDs. In other words, the user does not need to input the registration ID again and he/she only has to select one from a list.

If a comment such as the title of an image group or a memorandum can be set on each registration ID and the comment is displayed together with each registration ID upon displaying a list of the registration IDs, the user can easily recollect the content of images having been registered under each registration ID when he/she selects the registration ID.

Furthermore, if each registration ID is stored by relating the registration ID with only one user ID, that is, if one registration ID is not allowed to be related to a plurality of user IDs, unauthorized manipulation of a registered image by a stranger can be prevented even when the registration ID has been known to the stranger.

DESCRIPTION OF THE PREFERRED EMBODIMENTS

Hereinafter, an embodiment of the present invention will be explained with reference to the accompanying drawings. An outline of a network photograph service system will be explained first.

Figure 1:
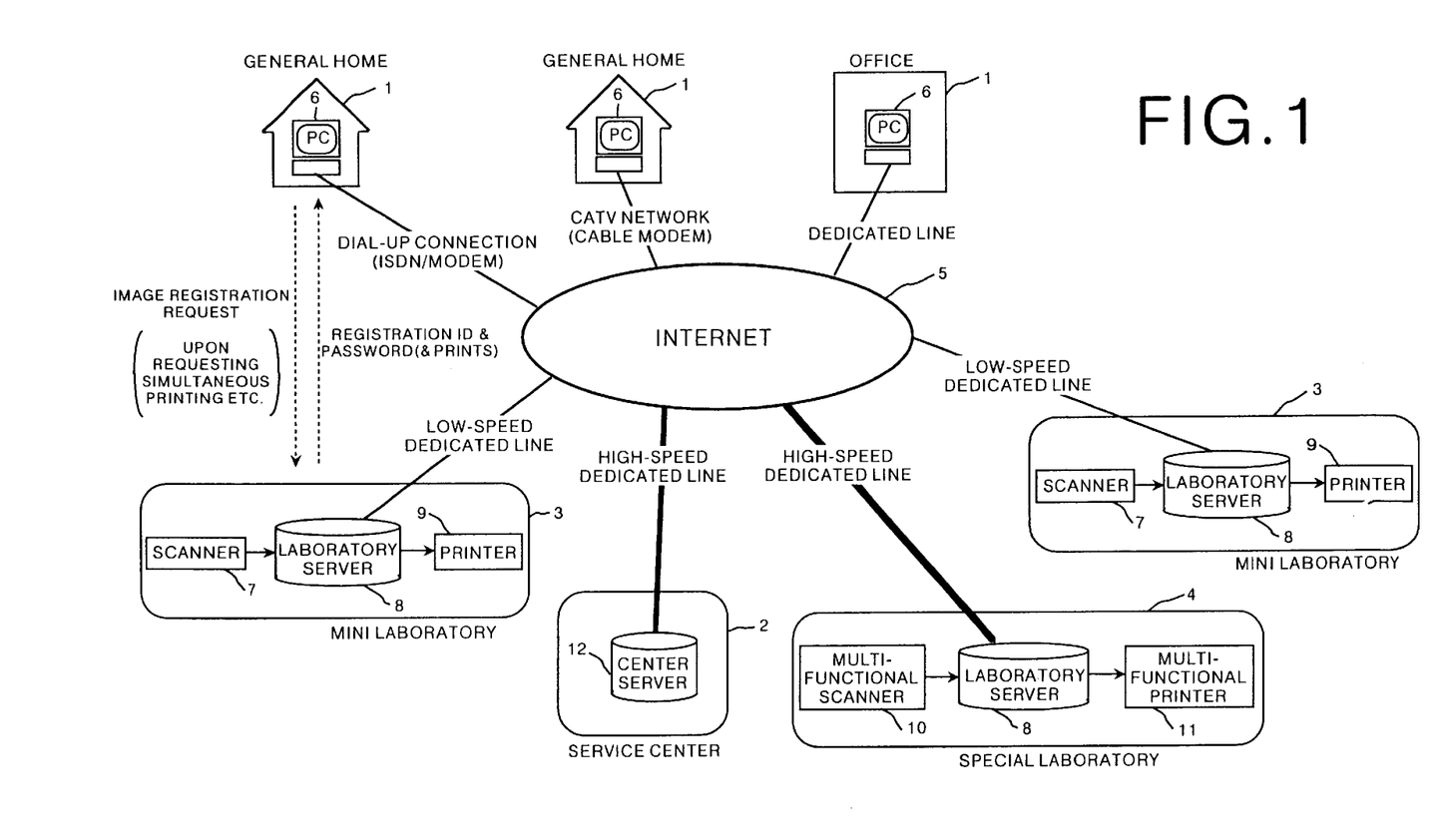
FIG. 1 is an illustration showing an outline of a network photograph service.

FIG. 1 shows the outline of a network photograph service system in an embodiment of the present invention. As shown in FIG. 1, the system provides a user 1 with a digital photograph service on a network by exchanging via the Internet 5 information between a service center 2 which receives an order for a service and a mini-laboratory 3 which outputs a print or a special laboratory 4 comprising special equipment. At this time, a connection to the Internet may be realized by any known form such as a dedicated line, a dial-up connection, or a CATV network. However, since the service center and the special laboratory have heavy communication loads, a connection by a dedicated line is preferable. In the explanation below, a server computer installed in the service center 2 is called a center server, and a server computer installed in the mini-laboratory 3 or the special laboratory 4 is called a laboratory server.

Input of image data to the above system is carried out at the mini-laboratory 3. The mini-laboratory usually carries out simultaneous printing wherein a film is developed and the developed film is read by a scanner 7 to generate a print using a printer 9. If registration of an image is requested at the time of requesting the simultaneous printing for example, the image data read from the film are registered with a database managed by a laboratory server 8, and a document wherein an image registration ID and a registration password are described is provided to the user together with the print.

Figure 2:
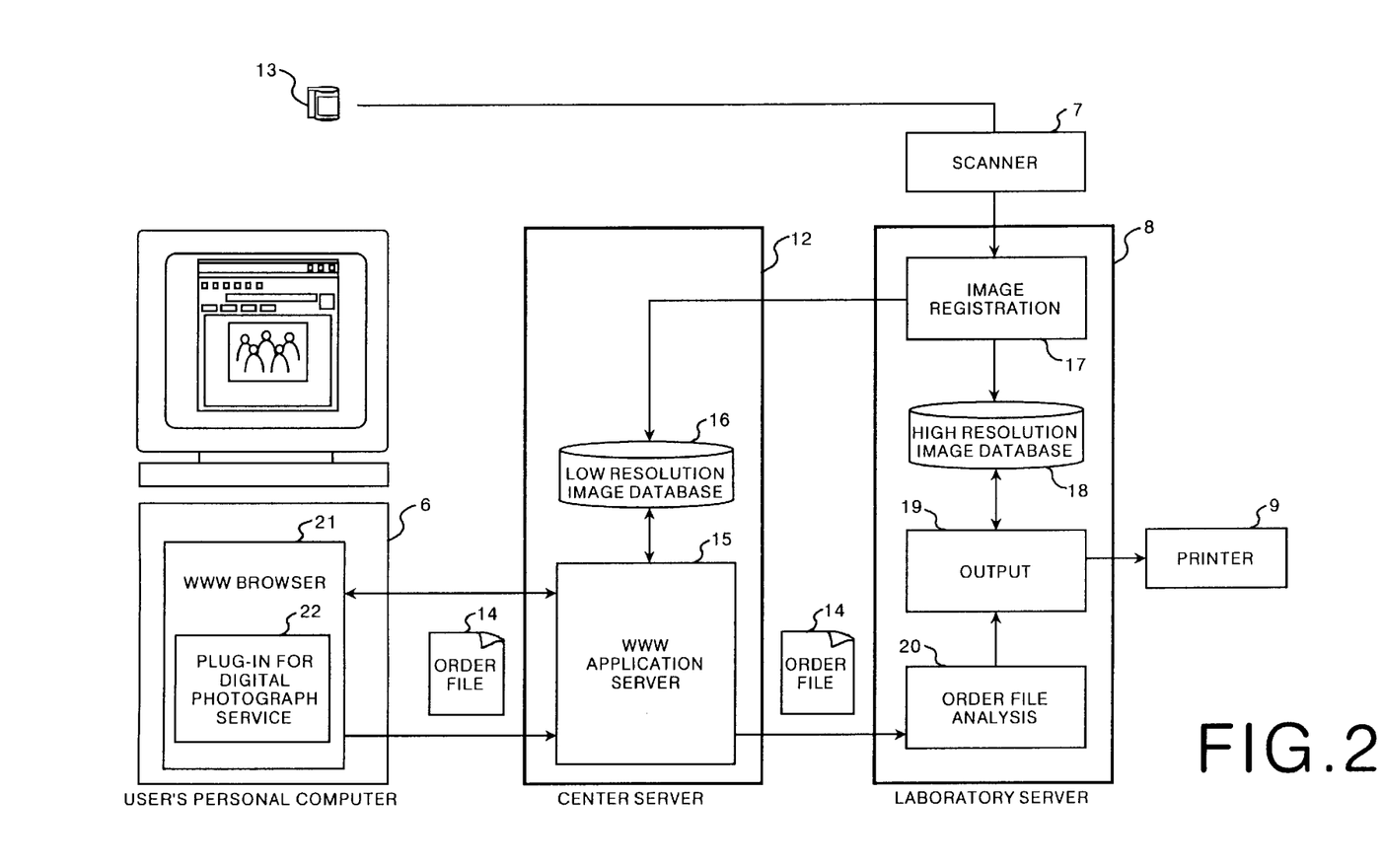
FIG. 2 is an illustration showing an internal configuration of the network photograph service system.

FIG. 2 shows the system in FIG. 1, wherein attention is paid to internal configurations of a personal computer of the user 1, a center server 12 at the service center 2, and the laboratory server 8 at the special laboratory 4.

As has been described above, when the user requests image registration, the image data having been read from a film 13 by the scanner 7 are registered by an image registering function 17 of the laboratory server 8 with a high resolution image database 18 managed by the laboratory server 8. Furthermore, low resolution image data (hereinafter called a thumbnail image) having a lower resolution than that of the above image data are generated by the laboratory server 8 and registered by the image registering function 17 with a low resolution image database 16 managed by the center server 12.

In this embodiment, image data to be stored in the high resolution image database have 4 bases of pixels (approximately 1024×1792) which is necessary for printing in an L size at 300 dpi. On the other hand, a thumbnail image for browsing has ¼ of a base of pixels (approximately 368×256).

The center server 12 at the service center 2 provides various kinds of services such as a printing service to the user 1 by disclosing on the network the thumbnail images registered with the low resolution image database 16.

The above-described service is provided in the form of a web page by a WWW application server 15. A program necessary to use such a service is provided to the user 1 in advance. In the example shown in FIG. 2, a plug-in 22 for a digital photograph service is provided to the user. By being incorporated with a browser 21, the plug-in 22 enables browsing, downloading, and ordering printing of the registered images by using the browser 21. The user can browse through the thumbnail images by accessing the web page of the center server 12 after installing the plug-in 22 to the WWW browser 21 such as Netscape Navigator. Furthermore, the user can request various kinds of digital photograph services, such as printing of the image he/she views.

When the user has input order information on the image to be printed, such as the image ID, the quantity and the size of prints, in order to request the printing service, an order file 14 describing the order information in a predetermined data format is generated and transferred to the application server 15 of the center server 12.

The WWW application server 15 finds the laboratory storing the high resolution image data corresponding to the requested image according to the image ID described in the order file, and transfers the order file 14 to the laboratory server 8 at the laboratory that has been found. The laboratory server 8 analyzes the content of the order file 14 by using an order file analyzing function 20, reads image data to be printed from the high resolution image database 18, carries out image processing (not shown) such as enlargement or reduction as required on the image data read out, and instructs printing to the printer 9 by transferring the processed image data.

In order to use the service provided by the web page, the user has to register himself/herself with the service provider in advance. When the user registration has been carried out, a user ID and a user password are issued to the user.

In a conventional network photograph service system, the user ID issued upon user registration has mainly been used in authentication processing upon the user's access to the system. Alternatively, the user ID has been used as a management code for managing information such as the name and address of the user.

Figure 3:
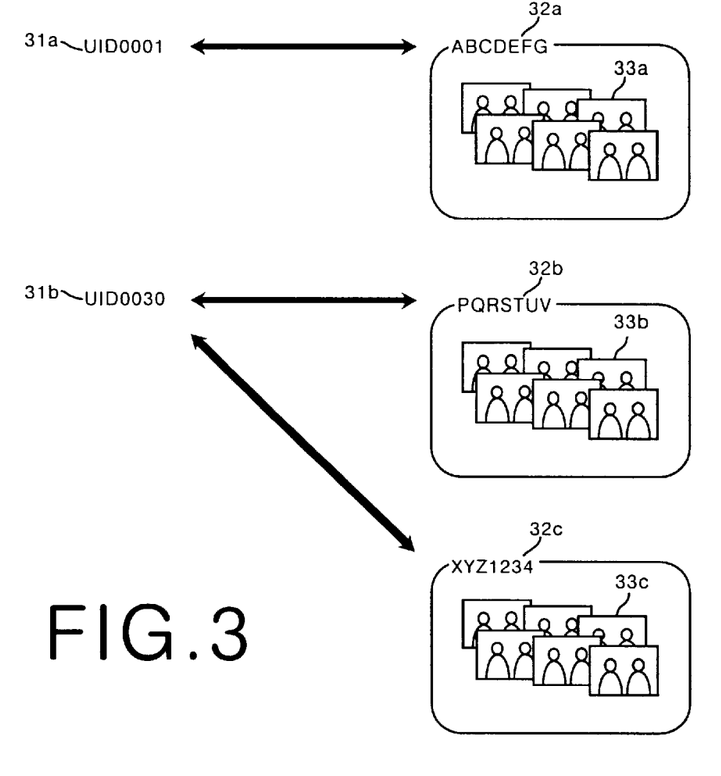
FIG. 3 is an illustration showing a concept of the present invention.

In the network photograph service system of the present invention, the user ID is used for managing the registration ID as well. FIG. 3 shows the idea of the present invention. As shown in FIG. 3, one registration ID 32 for each date of registration or per film has been issued to images 33 registered with the system. When the images are viewed on the network, the images are viewed in a group managed by the registration ID. As shown in FIG. 3, in the present invention, the registration IDs 32 are related to a user ID 31. For example, a registration ID 32*a* is related to a user ID 31*a* and registration IDs 32*b* and 32*c* are related to a user ID 31*b* in the example shown in FIG. 3.

Figure 4:
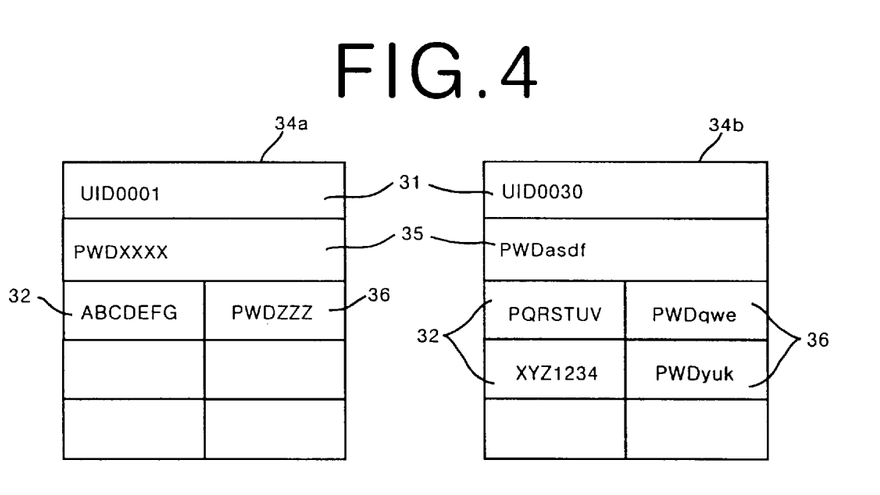
FIG. 4 is a diagram showing an example of a relation table.

The relationship is stored in the system as a relation table 34 such as the one shown in FIG. 4. The relation table shown in FIG. 4 stores the user ID 31 and a user password 35 in relation to the registration IDs 32 and registration password 36. However, the data structure to store the relationship is not limited to the example shown in FIG. 4, and another structure is possible in the present invention.

The user ID is related to the registration ID when the registration ID issued by the service provider is input to the system for the first time. Hereinafter, processing to relate the user ID with the registration ID and registration ID input assisting processing both carried out by the WWW application server 15 will be explained with reference to the flow-chart in FIG. 5.

Figure 5:
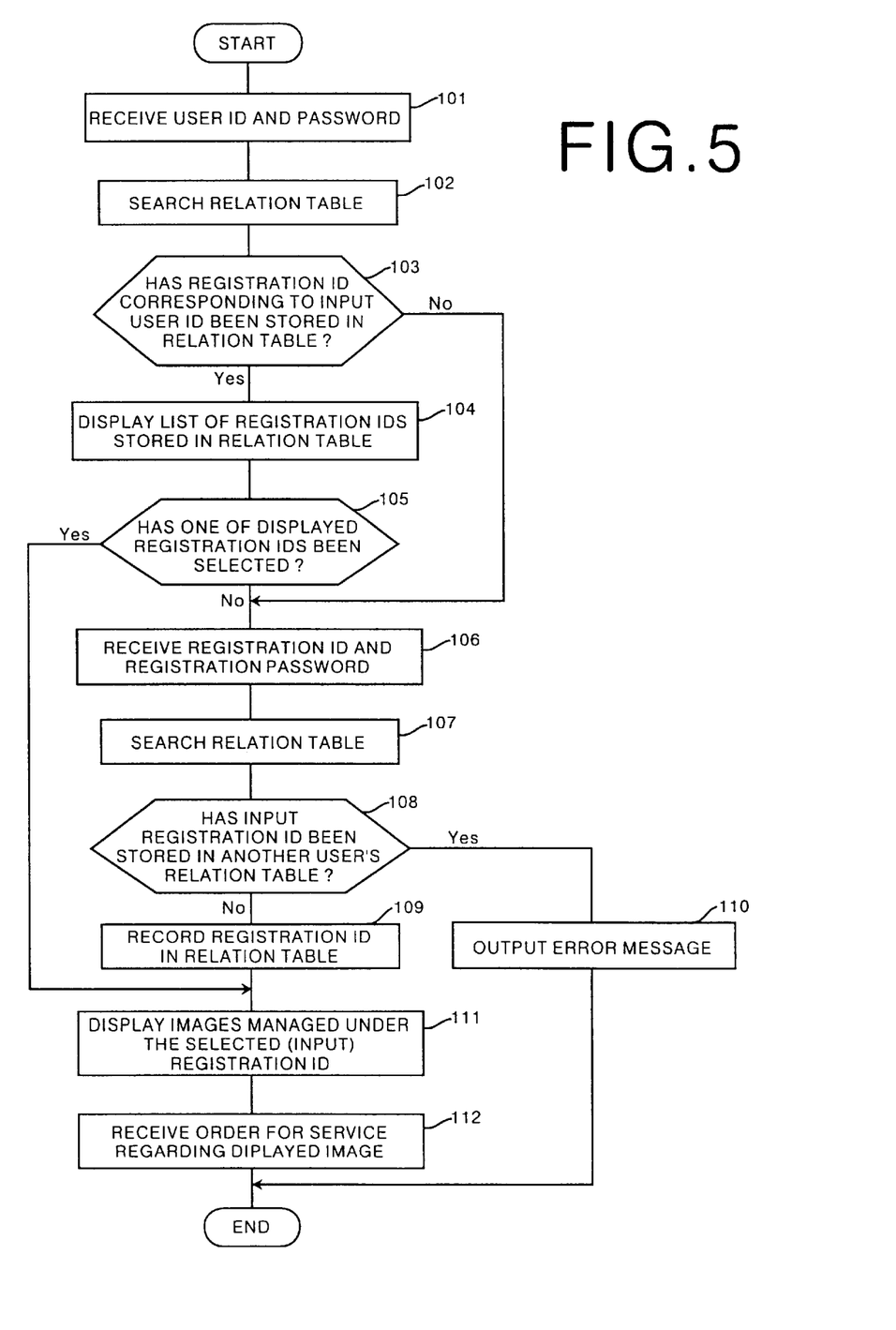
FIG. 5 is a flow chart showing an example of processing to relate a user ID to a registration ID and to assist registration ID input.

The WWW application server 15 receives input of the user ID and the user password (Step 101). More specifically, the input is prompted by an input box displayed for input of the user ID and the user password thereto. The user ID and the user password having been input are then compared with those stored in the system.

When the user ID and the user password input by the user are valid, a relation table corresponding to the user ID is searched for (Step 102), and whether or not registration ID or IDs have been stored in the relation table is judged (Step 103).

When the registration ID or IDs have been stored in the relation table, a list of the registration IDs 32 is displayed (Step 104). The display at Step 104 looks like a screen shown in FIG. 6, for example. The web page screen shown in FIG. 6 comprises an input box 39 for the registration ID, an input box 40 for the registration password, a display button 41*a* for requesting display of images managed by the registration ID, registration IDs 32 stored in the relation table, titles 42 set to the registration IDs, and display buttons 41*b* and 41*c* for requesting display of images managed by each of the registration IDs 32. When it is judged in Step 103 that no registration ID has been stored, the registration IDs 32, the titles 42 and the display buttons 41*b* and 41*c* are not shown on the screen.

Figure 6:
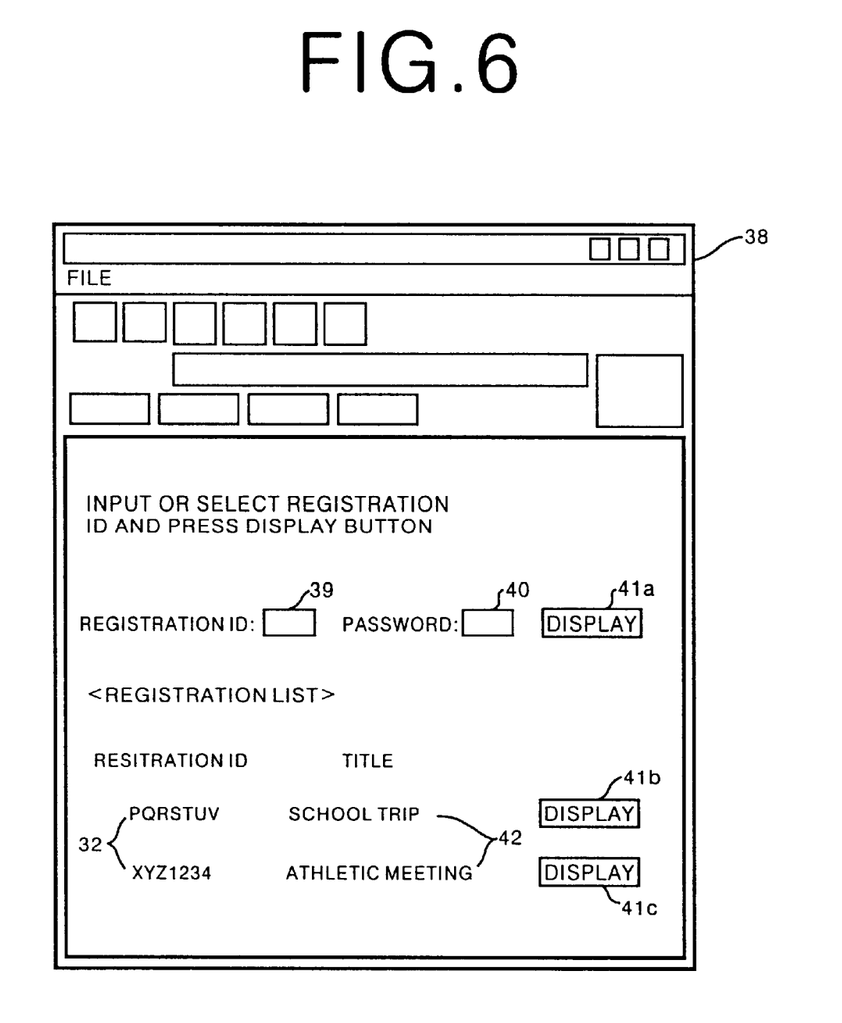
FIG. 6 is an illustration showing an example of a registration ID input screen.

On the screen shown in FIG. 6, the user can carry out 2 kinds of operations. One operation is to select a desired registration ID from the listed registration IDs and to click the display button 41*b* or 41*c* for the selected registration ID by using a mouse, and the other operation is to input a new registration ID and a registration password in the input boxes 39 and 40 and to click the display button 41*a* thereafter.

When any one of the registration IDs having been displayed is selected, that is, when the display button 41*b* or 41*c* is clicked (Step 105), the WWW application server 15 displays images managed by the selected registration ID (Step 111), and receives an order for printing service or the like regarding the images being displayed.

When the registration ID and the registration password are input in the input boxes 39 and 40 and the display button 41*a* is clicked (Step 105), the input registration ID and registration password are accepted (Step 106). The relation table is searched for (Step 107), and whether or not the received registration ID has been related to another user ID is checked (Step 108). In this embodiment, in order to prevent unauthorized use of registered images by a stranger, one registration ID is related to only one user ID. Therefore, if the registration ID is found to have been stored in any relation table as a result of the relation table check, an error message is output (Step 110), and the processing is stopped.

When the registration ID has not been stored in any relation table, the registration ID is newly recorded in the relation table of the user (Step 109). The images managed by the registration ID are displayed (Step 111), and an order for a service regarding the images is received (Step 112).

Figure 7:
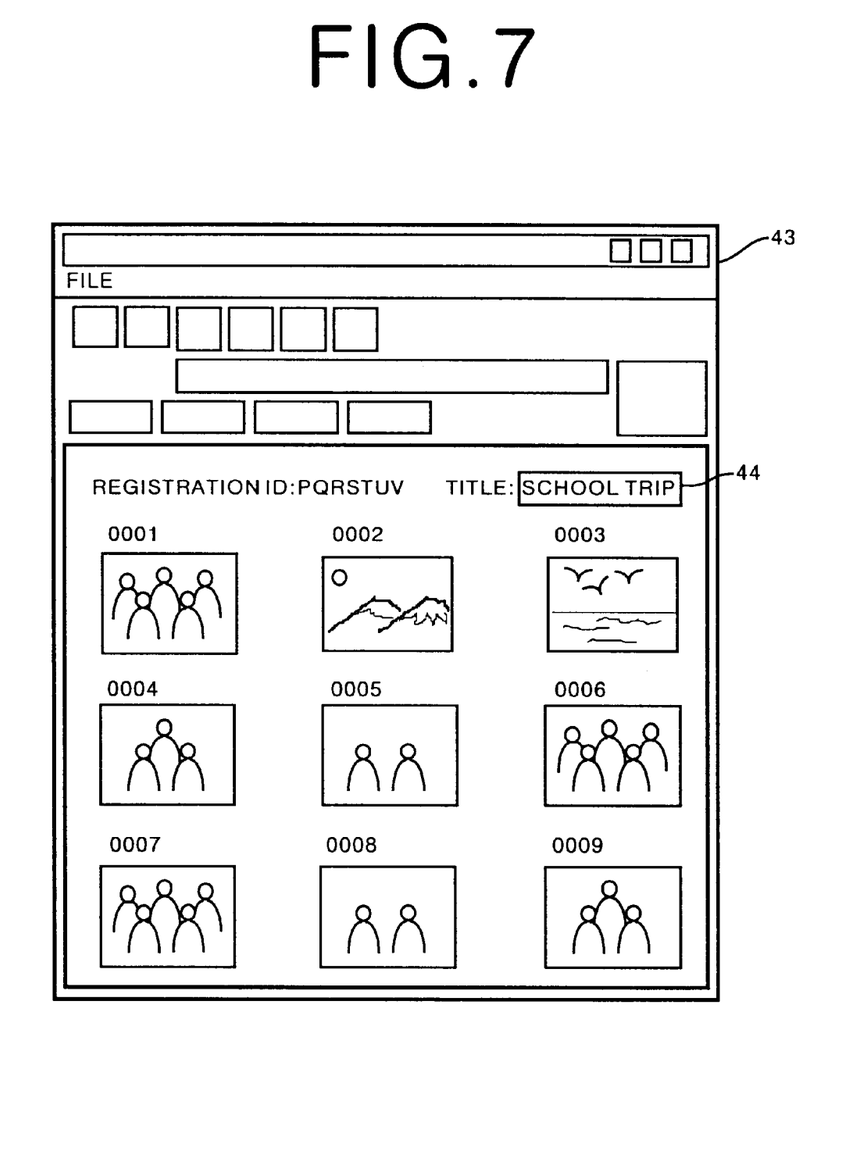
FIG. 7 is an illustration showing an example of a registered image display screen.

FIG. 7 shows an example of a display screen 43 at Step 111. When the display is carried out at Step 111 via Step 109, a title space 44 is empty. The user can set a title by inputting a desired title in the title space 44. The title set at this step is stored in the relation table together with the registration ID and the registration password (not shown in FIG. 4). Thereafter, when this screen is displayed, the title stored in the relation table is shown in the title space 44. By setting a title, the title 42 is also shown in the screen shown in FIG. 6. In this manner, the user can infer the content by viewing this title upon selecting the registration ID.

As has been described above, the present system stores a registration ID once input by relating the registration ID to a user ID, and by displaying the registration ID as a choice in a list of registration IDs thereafter, the user does not need to input the registration ID again. In other words, the present invention assists input of the registration ID and realizes easier usage of the network photograph service.

What is claimed is:

1. A network photograph service system which provides to a service user a variety of services using images registered by the service user by disclosing the images on a network, the network photograph service system comprising:

registered image storing means for storing at least one image group containing at least one image relating said at least one image group to a predetermined registration ID;

user ID input means for causing the service user to input a user ID for identifying the service user;

registration ID input means for enabling the service user to input the predetermined registration ID;

first image display means for displaying the at least one image belonging to the at least one image group stored in the registered image storing means and related to the input registration ID, when the predetermined registration ID is input by the registration ID input means;

registration list storing means for storing the registration ID by relating the registration ID to the user ID input by the user ID input means, when the predetermined registration ID is input by the registration ID input means;

registration ID display means for displaying a list of any predetermined registration IDs which are stored in the registration list storing means and related to the user ID input by the user ID input means;

registration ID selecting means for enabling the service user to select a desired predetermined registration ID from the listed registration IDs; and second image display means for displaying the at least one image belonging to the image group stored in the registered image storing means and related to the desired predetermined registration ID, when the desired predetermined registration ID is selected by the registration ID selecting means.

2. A network photograph service system as claimed in claim 1, further comprising comment setting means for enabling the service user to set a comment on each predetermined registration ID, the network photograph service system further comprising the registration ID display means displaying a list of comments on the registration IDs set by the comment setting means, together with the registration IDs.

3. A network photograph service system as claimed in claim 1, wherein the registration list storing means stores each registration ID by relating the registration ID to only one user ID.

4. A network photograph service system as claimed in claim 1, wherein the predetermined registration ID is an identifier assigned to said at least one image group according to a predetermined rule, said predetermined rule including at least one of assigning a predetermined registration ID by one day and assigning by images recorded on a single roll of film.

5. A network photograph service system as claimed in claim 1, further comprising comment setting means enabling the service user to set a comment for each registration ID.

6. A method of network photograph service which provides to a service user a variety of services using images registered by the service user by disclosing the images on a network, the network photograph service method comprising:

storing the registered images by relating at least one image group containing at least one image to a predetermined registration ID;

causing the service user to input a user ID for identifying the service user;

enabling the service user to input the predetermined registration ID;

displaying the at least one image belonging to the at least one image group stored by the registered image storing step and related to the input predetermined registration ID, when the predetermined registration ID is input by the registration ID input means;

storing the predetermined registration ID by relating the predetermined registration ID to the user ID input by the user ID input step, when the predetermined registration ID is input by the registration ID input step;

displaying a list of any predetermined registration IDs which are stored by the registration ID storing step and related to the user ID input by the user ID input step;

enabling the service user to select a desired predetermined registration ID from the listed registration IDs; and displaying the at least one image belonging to the image group stored by the registered image storing step and related to the desired predetermined registration ID, when the registration ID is selected by the registration ID selecting step.

7. The method according to claim 6, wherein the predetermined registration ID is an identifier assigned to said at least one group of images according to a predetermined rule, said predetermined rule including at least one of assigning a predetermined registration ID by one day and assigning by images recorded on a single roll of film.

8. The method according to claim 6, further comprising enabling the service user to set comments for each registration ID.

* * * * *